United States Patent
Lee et al.

(10) Patent No.: US 9,093,707 B2
(45) Date of Patent: Jul. 28, 2015

(54) MULTILAYER SOLID ELECTROLYTE FOR LITHIUM THIN FILM BATTERIES

(75) Inventors: Se-Hee Lee, Lakewood, CO (US); C. Edwin Tracy, Golden, CO (US); John Roland Pitts, Lakewood, CO (US); Ping Liu, Irvine, CA (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 11/816,730

(22) PCT Filed: Jun. 11, 2007

(86) PCT No.: PCT/US2007/070872
§ 371 (c)(1),
(2), (4) Date: Aug. 21, 2007

(87) PCT Pub. No.: WO2008/153564
PCT Pub. Date: Dec. 18, 2008

(65) Prior Publication Data
US 2010/0285372 A1    Nov. 11, 2010

(51) Int. Cl.
*H01M 10/0562* (2010.01)
*H01M 10/0585* (2010.01)
*H01M 6/40* (2006.01)
*H01M 10/04* (2006.01)
(Continued)

(52) U.S. Cl.
CPC .............. *H01M 6/40* (2013.01); *H01M 6/185* (2013.01); *H01M 6/187* (2013.01); *H01M 6/20* (2013.01); *H01M 6/24* (2013.01); *H01M 10/0436* (2013.01); *H01M 10/052* (2013.01); *H01M 10/0562* (2013.01); *H01M 10/0585* (2013.01); *H01M 4/661* (2013.01); *H01M 2300/0068* (2013.01); *H01M 2300/0094* (2013.01); *Y02E 60/122* (2013.01)

(58) Field of Classification Search
None
See application file for complete search history.

(56) References Cited

U.S. PATENT DOCUMENTS

| 4,234,554 A | 11/1980 | Rabenau et al. |
| 5,273,846 A | 12/1993 | Plichta et al. |

(Continued)

FOREIGN PATENT DOCUMENTS

WO    2006/077325 A2    7/2006

OTHER PUBLICATIONS

Mitterdorfer et al., Fabrication of Thin Electrolytes for Second-Generation Solid Oxide Fuel Cells, Solid State Ionics, 131, 2000, 79-96.
(Continued)

*Primary Examiner* — Jonathan Crepeau
(74) *Attorney, Agent, or Firm* — Michael A. McIntyre; John C. Stolpa; W. LaNelle Owens

(57) ABSTRACT

A lithium metal thin-film battery composite structure is provided that includes a combination of a thin, stable, solid electrolyte layer [18] such as Lipon, designed in use to be in contact with a lithium metal anode layer; and a rapid-deposit solid electrolyte layer [16] such as $LiAlF_4$ in contact with the thin, stable, solid electrolyte layer [18]. Batteries made up of or containing these structures are more efficient to produce than other lithium metal batteries that use only a single solid electrolyte. They are also more resistant to stress and strain than batteries made using layers of only the stable, solid electrolyte materials. Furthermore, lithium anode batteries as disclosed herein are useful as rechargeable batteries.

19 Claims, 2 Drawing Sheets

(51) Int. Cl.
*H01M 6/18* (2006.01)
*H01M 6/20* (2006.01)
*H01M 6/24* (2006.01)
*H01M 10/052* (2010.01)
*H01M 4/66* (2006.01)

(56) References Cited

U.S. PATENT DOCUMENTS

| | | | |
|---|---|---|---|
| 5,521,028 A * | 5/1996 | Gauthier et al. | 429/234 |
| 5,677,081 A * | 10/1997 | Iwamoto et al. | 429/319 |
| 6,025,094 A | 2/2000 | Visco et al. | |
| 6,277,524 B1 * | 8/2001 | Kanno | 429/304 |
| 6,355,379 B1 | 3/2002 | Ohshita et al. | |
| 6,365,300 B1 * | 4/2002 | Ota et al. | 429/304 |
| 6,402,795 B1 | 6/2002 | Chu et al. | |
| 6,420,071 B1 * | 7/2002 | Lee et al. | 429/300 |
| 6,805,999 B2 * | 10/2004 | Lee et al. | 429/162 |
| 2004/0048157 A1 | 3/2004 | Neudecker et al. | |
| 2004/0072066 A1 | 4/2004 | Cho et al. | |
| 2004/0142244 A1 * | 7/2004 | Visco et al. | 429/246 |
| 2004/0209159 A1 | 10/2004 | Lee et al. | |
| 2004/0219434 A1 * | 11/2004 | Benson et al. | 429/304 |
| 2005/0100793 A1 | 5/2005 | Jonghe et al. | |
| 2005/0238956 A1 * | 10/2005 | Lee | 429/211 |
| 2007/0015060 A1 * | 1/2007 | Klaassen | 429/309 |
| 2010/0285372 A1 * | 11/2010 | Lee et al. | 429/320 |

OTHER PUBLICATIONS

International Search Report and Written Opinion of the International Searching Authority dated Feb. 14, 2008, for International Application No. PCT/US2007/70872.

Lee, "Lithium Thin-Film Battery with a Reversed Structural Configuration SS/Li/Lipon/Li$_x$V$_2$O$_5$/Cu", Electrochemical and Solid-State Letters, 2003, A275-A277.

Shiraishi, "Effect of Surface Modification Using Various Acids on Electrodeposition of Lithium", Journal of Applied Electrochemistry, 1995, 584-591.

International Preliminary Report on Patentability for International (PCT) Application PCT/US2007/070872, Issued Dec. 11, 2009.

* cited by examiner

US 9,093,707 B2

MULTILAYER SOLID ELECTROLYTE FOR LITHIUM THIN FILM BATTERIES

CONTRACTUAL ORIGIN OF THE INVENTION

The United States Government has rights in this invention pursuant to Contract No. DE-AC36-99GO10337 between the United States Department of Energy and the Renewable Energy Laboratory, a Division of the Midwest Research Institute.

BACKGROUND ART

Lithium-based batteries are batteries that have lithium metal or lithium compounds as an anode, generally producing voltages from 1.5V to about 3V, twice the voltage of an ordinary zinc-carbon battery or alkaline cell. Lithium batteries are used in many portable consumer electronic devices, and are widely used in industry. Lithium batteries that use lithium metal have safety disadvantages when used as secondary (rechargeable) energy sources.

Thin film lithium and lithium-ion batteries are used for applications where a small power source is needed. These batteries can be fabricated on a variety of substrates including microchips. Typically, they are rechargeable. The layers of thin-film, solid state batteries are typically deposited by methods commonly used in the semiconductor and optical coating industries.

The foregoing examples of related art with limitations related thereto are intended to be illustrative and not exclusive. Other limitations and teachings of the related art will become apparent to those of skill in the art upon a reading of the specification and a study of the drawings.

DISCLOSURE OF THE INVENTION

Thin-film solid-state lithium metal battery composite structures containing two or more solid-state electrolyte layers are shown to be more efficiently and rapidly produced when a solid-state electrolyte portion is made using a thin, stable solid electrolyte layer such as Lipon designed to be in direct contact with a lithium anode layer, combined with a thicker rapid-deposit solid electrolyte layer, or a thicker electrolyte layer composed of two or more rapid-deposit solid electrolyte sublayers. These battery composite structures have also been shown to have increased resistance to cracking compared with previous structures comprising, as the only electrolyte, a thicker layer of Lipon or other brittle solid electrolyte material that is stable in contact with lithium metal.

In addition to the exemplary aspects and embodiments described above, further aspects and embodiments will become apparent by reference to the drawings and by study of the following descriptions.

Figure 1:
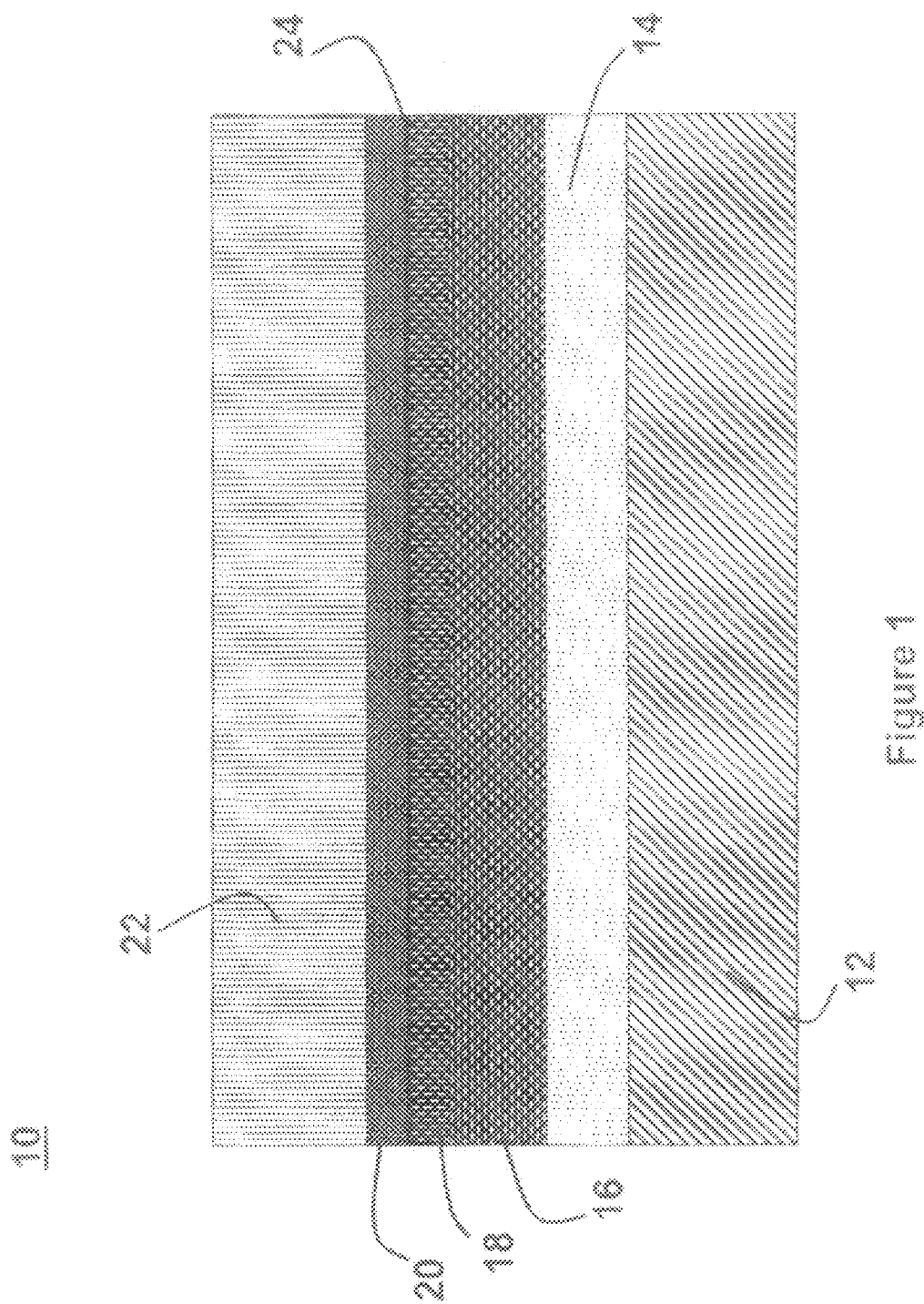
FIG. 1 shows a cross-section of an exemplary thin-film solid-state battery composite structure containing two solid-state electrolyte layers.

Exemplary embodiments are illustrated in referenced figures of the drawings. It is intended that the embodiments and figures disclosed herein are to be considered illustrative rather than limiting.

BEST MODE FOR CARRYING OUT THE INVENTION

The following embodiments and aspects thereof are described and illustrated in conjunction with systems, tools and methods which are meant to be exemplary and illustrative, not limiting in scope.

A lithium metal thin-film, battery composite structure is provided that has a plurality of solid or polymer-based electrolyte layers. A "lithium metal" battery as used herein is one having a lithium metal anode. A "thin-film" battery is one having layers that are "thin films" as understood in the art. Typically, a thin film is less than 1000 μm thickness, often 1 μm or less in thickness, e.g., 10 to 1000 nanometers thick.

A "plurality" as used herein means two or more. Although the exemplary batteries described herein typically have two to four electrolyte layers, the battery can have any practical number of layers. A "battery composite structure" as used herein means a complete battery or a portion thereof comprising two or more thin-film layers. For example a "battery composite structure" can be a set of thin-film layers that lacks a cathode or other elements necessary for a fully-functional battery.

The battery composite structures hereof are especially useful for secondary batteries and portions thereof. A "secondary" battery is one that can be recharged. The battery composite structures hereof are, or can be completed to become, secondary batteries typically capable of providing up to 1000 or more cycles of operation, a cycle being composed of the period of operation of the battery to produce current and the recharging period.

The battery composite structures hereof are made using solid electrolyte materials now known or later developed.

The various layers comprising the battery composite structure can be deposited using one or more techniques known to those skilled in the art, for example, vacuum evaporation, pyrolytic decomposition, sputtering, chemical vapor deposition, including plasma-enhanced chemical vapor deposition, pulsed laser deposition, and the like.

The battery composite structure comprises a lithium metal anode layer. The lithium metal layer in the fully-charged battery composite structure has a thickness between about 10 and about 1000 nm. In some embodiments it has a thickness between about 50 and about 1000 nm, or between about 50 and about 100 nm.

A thin layer of a solid electrolyte material that is known to be stable in contact with lithium metal as well as for its ability to be a facile conductor of lithium ions between the cathode and the anode is designed to be in contact with the lithium metal anode layer. The term "stable" as used herein with respect to this layer means that the layer reacts minimally, if at all, with lithium metal, and does not degrade the lithium metal layer such that the usefulness of the lithium metal layer is destroyed even after repeated cycles, e.g., up to about 1000 or more cycles. Typically, substoichiometric lithium phosphorous oxynitride is used as such a stable, solid electrolyte layer. Substiochiometric lithium phosphorous oxynitride is a family of materials having the general formula $Li_xPO_yN_z$. In the "as deposited" state, the material has values for x and y of about 3, and for z of about 1.5. These materials are referred to herein as Lipon. This thin layer of stable solid electrolyte should be between about 10 and about 100 nm thick, or in certain embodiments, between about 50 and about 100 nm thick.

Stable electrolyte materials useful herein also include glass-forming compounds that are stable against metallic lithium, such as lithium silicates, lithium borates, lithium aluminates, lithium phosphates, lithium phosphorus oxynitrides, lithium silicosulfides, lithium borosulfides, lithium aluminosulfides, and lithium phosphosulfides. Specific examples of protective layer materials include $6LiI$—$Li_3PO_4$—$P_2S_5$, $B_2O_3$—$LiCO_3$—$Li_3PO_4$, $LiI$—$Li_2O$—$SiO_2$, $LiI$, $Li_2WO_4$, $LiSO_4$, $LiIO_3$, $Li_4SiO_4$, $Li_2Si_2O_5$, $LiAlSiO_4$, $Li_4(Si_{0.7}Ge_{0.3})O_4$, $Li_4GeO_4$, $LiAlCl_4$, $Li_3PO_4$, $Li_3N$, $Li_2S$, $Li_2O$, $Li_5AlO_4$, $Li_5GaO_4$, $Li_6ZnO_4$, $LiAr_2(PO_4)_3$, $LiHF_2(PO_4)_3$, $LiINS_2$, $LiMgF$ and $LiAlMgF_4$, $Li_2S$—$P_2S_5$, $LiI$—$Li_2S$—$P_2S_5$, and $Li_2S$—$GeS_2$—$P_2S_5$. These stable electrolytes typically have a deposition rate using deposition processes as described above between about 5 nm/min and about 15 nmlmin. In some embodiments these stable electrolytes have a deposition rate between about 10 and about 15 nmlmin using reactive sputtering deposition methods, CVD (chemical vapor deposition) or PVD (physical vapor deposition). It is best to deposit the lithium on the Lipon rather than to deposit the Lipon on the lithium because the deposition process can damage the lithium.

The layer of stable electrolyte material is in contact with a layer comprising a solid electrolyte material that has a faster deposition rate than that of the stable electrolyte layer. Such electrolytes are referred to herein as rapid-deposit electrolytes. Rapid-deposit solid polymeric electrolytes useful herein are lithium ion conductors and include polymers known in the art such as polyethers, polyimines, polythioethers, polyphosphazenes, and polymer blends, mixtures, and copolymers thereof to which an appropriate electrolyte salt has optionally been added. In some embodiments the polymeric electrolytes are polyethers or polyalkylene oxides. Typically, the polymeric electrolyte contains less than about 20% liquid. The rapid-deposit electrolyte layer can also be a ceramic or glass such as beta alumina-type materials. Specific examples include sodium beta alumina, Nasicon™ or Lisicon™ glass or ceramic. Other suitable rapid-deposit solid electrolytes include $Li_3N$, $LiF_3$, $LiAlF_4$ and $Li_{1-x}Al_xTi_{2-x}(PO_4)_3$ where x is determined by the concentration of Al in the compound.

There can be two or more rapid-deposit electrolyte layers with each layer being made of the same or different materials. For example, the stable electrolyte layer can be deposited on a layer of $LiAlF_4$ which was laid down on one or more solid polymeric electrolyte layer as described herein. Such a construction has the advantage of further improving the physical and mechanical properties of the multilayer electrolyte layers, and making them more resistant against the tensile stresses to which multilayer thin film batteries are subjected. The two rapid-deposit electrolyte layers can also be a layer of dense $LiAlF_4$ and a layer of porous LiAlF4, when adhesion characteristics on polymeric substrates is important.

When a single rapid-deposit electrolyte material is used, this layer should be about 650 nm to about 1000 nm (1 μm) thick, and in some embodiments about 900 to about 1000 nm thick. When multiple rapid-deposit electrolyte layers are used, the total thickness of these combined layers can be up to about 20 μm.

The rapid-deposit electrolyte materials have a deposit rate of at least about 100 nmlmin, and can be deposited as quickly as about 1000 nm/min using CVD or PVD.

The lithium anode layer can also be in contact with an anode current collector chosen for its electrical conductivity and its inert character toward attack by lithium metal. The anode current collector can be, for example, a refractory metal, such as copper or nickel. It may also be a chrome ferrous alloy, stainless steel such as type 430, also designated as ASTM A176 and type 304, also designated as type A167. The anode current collector may also be a layer of any other conductive metal that is compatible with lithium metal, for example iron, or any transition metal that does not form intermetallic compounds with lithium. It can also be a non-electrical conductor, for example glass or a plastic, such as will be familiar to those of ordinary skill in the art, for example, polyester onto which a conductive film has been deposited, for example, a film of gold. stainless steel or other metal, such as copper, plastic bearing a conductive coating on at least one face, or glass bearing a conductive coating on at least one face. The anode current collector layer typically has a thickness between about 50 nm and about 500 nm.

A cathode layer may be part of the battery composite structure provided herein, and the rapid-deposit electrolyte can be deposited on the cathode layer. Suitable cathode materials are known in the art, and include lithium vanadate, lithium manganate, lithium nickelate, and lithium cobaltate, lithium molybdenum oxide, and lithium titanium oxide. The cathode layer typically has a thickness between about 50 nm and about 5000 nm.

In turn, the cathode layer can be formed by deposit on a substrate known in the art to be useful as a cathode current collector, e.g., copper, aluminum, gold, and refractory metals, and other materials as described above with respect to the composition of the anode current collector. The cathode current collector layer typically has a thickness between about 50 nm and about 500 nm.

FIG. 1 shows an embodiment of a thin-film, solid-state battery composite structure 10 comprising a cathode current collector layer 12, which is in contact with a cathode layer 14, which is in contact with a rapid-deposit solid electrolyte layer 16, which is in contact with a thin, stable solid electrolyte layer 18, which is in contact with a lithium anode layer 20. Chemical reactions at the interface 24 between the thin, stable solid electrolyte layer 18 and the lithium anode layer 20 are minimized by the use of the stable layer 18. The lithium anode layer 20 is in contact with an anode current collector layer 22.

Figure 2:
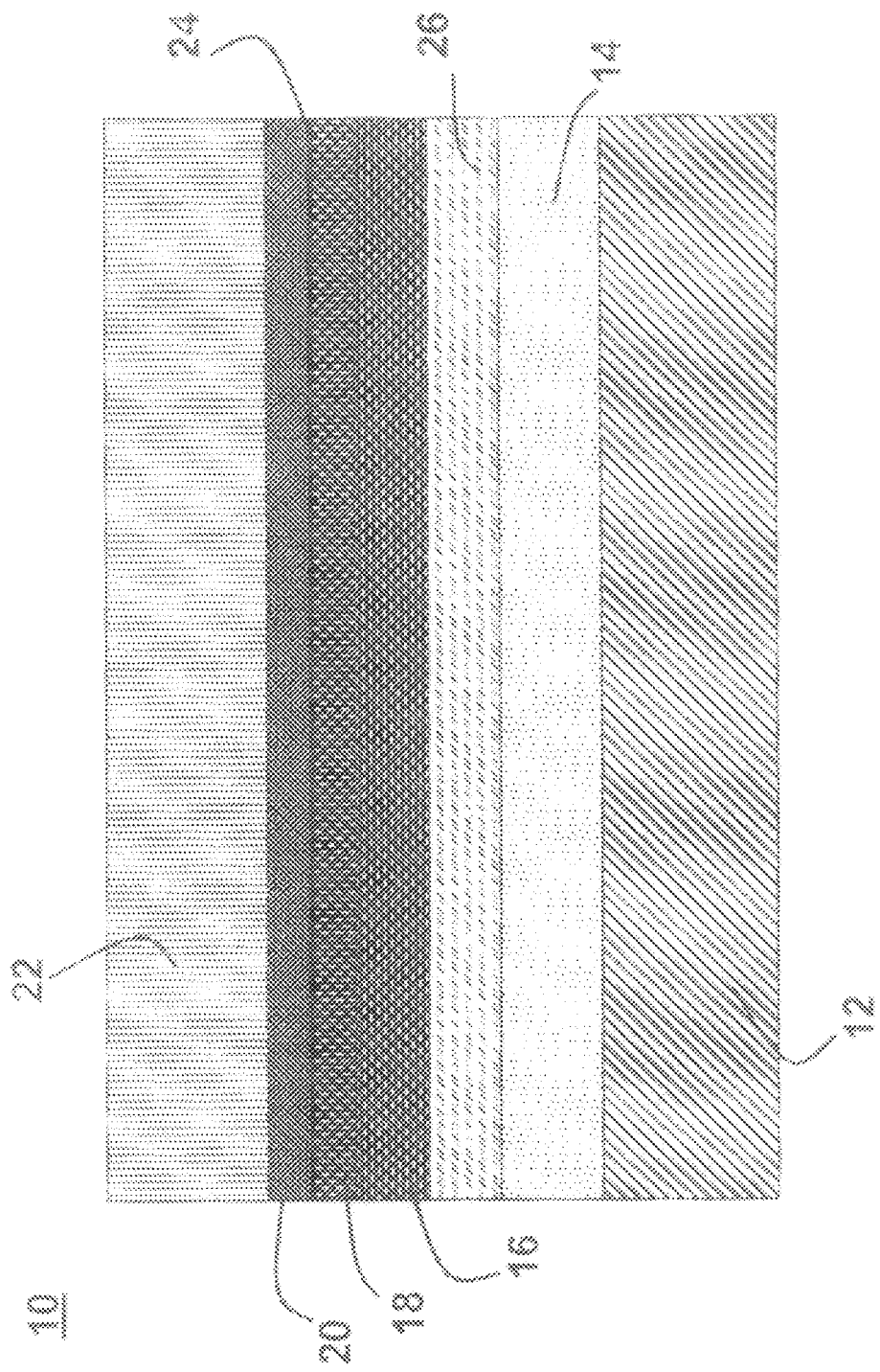
FIG. 2 shows a cross-section of an exemplary thin-film solid-state battery composite structure containing three solid-state electrolyte layers.

FIG. 2 shows an alternate embodiment of a thin-film, solid-state battery composite structure comprising the layers described above with respect to FIG. 1, and also comprising an additional rapid-deposit solid electrolyte layer 26 between cathode layer 14 and rapid-deposit solid electrolyte layer 16.

The thin-film, solid-state battery composite structures described above can be made by forming layers and combinations of layers in any order desired. In one embodiment, shown in FIG. 1, a cathode layer 14 is deposited on a cathode current collector layer 12. A rapid-deposit solid electrolyte layer 16 is deposited on cathode layer 14. Then a thin, stable solid electrolyte layer 18 is deposited on rapid-deposit solid electrolyte layer 16, and a lithium anode layer 20 is deposited on thin, stable solid electrolyte layer 18.

In another embodiment, shown in FIG. 2, a cathode layer 14 is deposited on a cathode current collector layer 12. A rapid-deposit solid electrolyte layer 16 is deposited on cathode layer 14. An additional rapid-deposit solid electrolyte 26 is deposited on rapid-deposit solid electrolyte layer 16. Then a thin, stable solid electrolyte layer 18 is deposited on rapid-deposit solid electrolyte layer 16, and a lithium anode layer 20 is deposited on thin, stable solid electrolyte layer 18. In other embodiments, further rapid-deposit solid electrolyte layers are deposited on the rapid-deposit solid electrolyte 26, for example, the total thickness of the combined rapid-deposit solid electrolyte layers is about 20 μm.

In additional embodiments, a thin, stable solid electrolyte layer 18, such as Lipon, is deposited on a lithium-containing anode current collector layer 22, such as stainless steel. A rapid-deposit solid electrolyte layer 16 is then deposited on the thin, stable solid electrolyte layer 18. A cathode layer 14, e.g., $Li_xV_2O_5$ where x has a value of 1 to 3, is then deposited on rapid-deposit solid electrolyte layer 16. A cathode current collector layer 12, such as Cu or Al, which is electrically conductive, is then deposited on cathode layer 14.

An electric current is then flowed between the conductive face of anode current collector layer 22 and cathode current collector layer 12. This causes a lithium anode layer 20 to form between anode current collector layer 22 and thin, stable solid electrolyte layer 18. In one embodiment, lithium-containing cathode layer 14 can be formed by lithiating a transition metal oxide cathode layer until it contains a supra-stoichiometric amount of lithium.

In further embodiments, an additional rapid-deposit solid electrolyte layer 26 can be laid down on thin, stable solid electrolyte layer 18, before rapid-deposit solid electrolyte layer 16 is added.

The battery composite structures described above may comprise complete batteries, or may need to be completed by the addition of further components, or by charging, all as is known in the art. Completed batteries can be used for a variety of applications including providing electricity for operating devices such as implantable medical devices, remote sensors, miniature transmitters, smart cards, and microelectronic devices.

EXAMPLE

A coupon of type 430 stainless steel (an article of commerce also known to those of ordinary skill in the art as ASTM A176, an alloy having 16 wt. % chromium or more) is cut from sheet stock obtained from Teledyne Rodney Metals, Inc., New Bedford, Mass. The coupon is prepared for use as an anode current collector by washing the stainless steel in a detergent solution, rinsing with deionized water, followed by an additional ethyl alcohol rinse, and drying in room air. The detergent employed is Alkanox, a commercial detergent for cleaning laboratory glassware, but any neutral detergent formulated for such purpose can alternatively be employed.

Thus prepared, to lay down a thin, stable solid-electrolyte layer, the anode current collector layer is placed into a vacuum chamber containing a target of $Li_3PO_4$. The chamber is evacuated to $10^{-5}$ torr and a sub-stoichiometric lithium phosphorous oxynitride film of 10.0 nm-thick electrolyte layer is formed upon the exposed face of the stainless steel anode current collector substrate by reactive ion sputtering in 20 millitorr of nitrogen gas using a RF power setting of 4-5 $W/cm^2$. This step is completed in 4 seconds.

A layer of rapid-deposit solid electrolyte $LiAlF_4$ 1000 nm thick is then formed on the exposed face of the stable solid-electrolyte layer by thermal evaporation. This step is completed in about 60 seconds.

A 500 nm-thick cathode film is next formed by first depositing a vanadium oxide film onto the rapid-deposit $LiAlF_4$ electrolyte film. This vanadium oxide thin film is deposited by thermal evaporation of a corresponding $V_2O_3$ powder source.

Thus formed, the vanadium oxide layer is then lithiated by exposing the vanadium oxide layer to lithium vapor. Lithium vapor is obtained by thermal evaporation of pure Li metal onto the $V_2O_5$ layer at room temperature in a $10^{-5}$ mbar vacuum. Upon contact with the vanadium oxide film, lithium diffuses into the vanadium oxide material, forming a lithium vanadium oxide cathode. Treatment with lithium vapor is continued until a material approximating the formula $Li_xV_2O_5$ is obtained, wherein x is 3.

Onto the lithiated vanadium oxide layer is deposited a 200-300 nm layer of aluminum metal by vacuum evaporation to act as the cathode current collector. The total time required for fabrication of these layers is about 1 hour. In contrast, the total time required for fabrication of similar structures containing only a single solid-state electrolyte layer made of a material such as Lipon, that is stable in contact with lithium metal, is about 2 hrs.

Thus prepared, the multi-layered battery precursor composite structure is removed from the vacuum chamber and connected to an Arbin potentio-galvanostatto apply a constant current and monitor voltage changes. Current is applied to the multi-layered material until the cell voltage reaches about 3.8 V vs. Li. In this manner a buried lithium anode is created forming a thin-film battery which can be handled in the ambient environment without further isolation. The discharge capacity of this battery is about 25 $\mu Ah/cm^2$ which corresponds to about 1.4 mole Li per mole of $V_2O_5$.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A rechargeable lithium battery device comprising:
   an anode current collector comprising a metal material selected from copper, nickel, chrome ferrous alloy, a refractory metal, or stainless steel, the metal material being substantially inert toward a lithium metal material;
   an anode overlaying the anode current collector, and the anode being electrically coupled to the current collector and comprising lithium metal material;
   a first electrolyte layer overlaying the anode consisting of $Li_2S$, $Li_2O$, or combinations thereof, the first electrolyte layer being substantially stable toward lithium metal material, the first electrolyte layer being characterized by a first deposition rate and a thickness of 10-100 nm;
   a second electrolyte layer in direct contact with the first electrolyte layer and comprising at least one of lithium nitride, lithium fluoride, or lithium aluminum fluoride, the second electrolyte layer being characterized by a second deposition rate;
   a cathode overlaying the second electrolyte layer; and
   a cathode current collector overlaying the cathode;
   wherein the first electrolyte layer and the second electrolyte layer are characterized by a total thickness of less than 20 um.

2. The device of claim 1 wherein the anode current collector is characterized by a thickness of about 50-500 nm.

3. The device of claim 1 wherein the anode current collector further comprises a non-conductive substrate material, the metal material overlaying a surface of the non-conductive substrate material.

4. The device of claim 1 wherein the metal material comprises a transition metal material.

5. The device of claim 1 wherein the first electrolyte layer being useful for up to 1000 cycles.

6. The device of claim 1 wherein the first deposition rate is from about 5 nm/min to about 15 nm/min.

7. The device of claim 1 wherein the first electrolyte layer is formed by a vapor deposition process.

8. The device of claim 1 wherein the second electrolyte layer further comprises a polymer material.

9. The device of claim 8 wherein the cathode comprises material selected from lithium vanadate, lithium manganate, lithium nickelate, lithium cobaltate, lithium molybdenum oxide, or lithium titanium oxide.

10. The device of claim 1 wherein the cathode is characterized by a thickness of about 50 nm to about 5000 nm.

11. The device of claim 1 wherein the cathode is formed by deposition on the cathode current collector.

12. The device of claim 1 wherein the cathode current collector comprises at least one of copper, aluminum, gold, chrome ferrous alloy, or refractory metals.

13. The device of claim 1 wherein the cathode current collector is characterized by a thickness of about 50-500 nm.

14. The device of claim 1 wherein the second electrolyte layer is formed by a rapid deposition process.

15. The device of claim 1 wherein the second electrolyte layer further comprises at least one of a polyether, a polyimine, a polythioether, a polyphosphazene, or a polymer blend.

16. The device of claim 1 wherein the second electrolyte layer is substantially free from liquid.

17. The device of claim 1 wherein the second deposition rate is about 1000 nm/min.

18. The device of claim 1 wherein the second electrolyte layer being characterized by a thickness of 650-1000 nm.

19. The device of claim 1 wherein the second deposition rate is higher than the first deposition rate.

* * * * *